(12) United States Patent
Hannay

(10) Patent No.: US 7,414,614 B2
(45) Date of Patent: Aug. 19, 2008

(54) USER INTERFACE

(75) Inventor: Alexander Hannay, London (GB)

(73) Assignee: Nokia Corporation, Espoo (FI)

( * ) Notice: Subject to any disclaimer, the term of this patent is extended or adjusted under 35 U.S.C. 154(b) by 318 days.

(21) Appl. No.: 10/512,132

(22) PCT Filed: Apr. 26, 2002

(86) PCT No.: PCT/GB02/01878

§ 371 (c)(1),
(2), (4) Date: May 2, 2005

(87) PCT Pub. No.: WO03/091866

PCT Pub. Date: Nov. 6, 2003

(65) Prior Publication Data

US 2005/0174334 A1    Aug. 11, 2005

(51) Int. Cl.
*G06F 3/02* (2006.01)

(52) U.S. Cl. .................... 345/169; 345/160; 345/161; 341/22

(58) Field of Classification Search ............... 345/156, 345/168–178, 160, 161; 379/433.01; 341/22
See application file for complete search history.

(56) References Cited

U.S. PATENT DOCUMENTS

| 5,236,199 | A | * | 8/1993 | Thompson, Jr. ............... 463/41 |
| 5,367,316 | A | | 11/1994 | Ikezaki ........................ 345/158 |
| 5,973,621 | A | * | 10/1999 | Levy ............................ 341/22 |
| 6,075,575 | A | * | 6/2000 | Schein et al. ................ 348/734 |
| 7,206,599 | B2 | * | 4/2007 | Lemley .................... 455/550.1 |
| 7,265,745 | B1 | * | 9/2007 | Kling ......................... 345/169 |
| 2001/0044317 | A1 | * | 11/2001 | Prior et al. .................. 455/550 |

FOREIGN PATENT DOCUMENTS

| JP | 04118715 | 4/1992 |
| JP | 2000032110 | 1/2000 |

OTHER PUBLICATIONS

IBM TDB vol. 26 Issue 4 pp. 1967-1968 Sep. 1, 1983.*
IBM TDB vol. 26 Issue 7B pp. 3746-3747 Dec. 1, 1983.*
Williams, J.A., "Keyboard Cursor Control Layout", Sep. 1983, IBM Technical Disclosure Bulletin, vol. 26, No. 4, pp. 1967-1968.

* cited by examiner

*Primary Examiner*—Alexander Eisen
*Assistant Examiner*—Christopher E Leiby
(74) *Attorney, Agent, or Firm*—Harrington & Smith, PC

(57) ABSTRACT

A user input device for providing 8-way directional control, comprising a first set of sensors consisting of a first sensor adjacent a second sensor, constituting a first pair of sensors, and a third sensor adjacent the second sensor, constituting a second pair of sensors; and a second set of sensors, adjacent the second set of sensors, consisting of a fourth sensor adjacent a fifth sensor, constituting a third pair of sensors, and a sixth sensor adjacent the fifth sensor, constituting a fourth pair of sensors; wherein user actuation of a respective one of at least four of the six sensors provides for control in a respective one of four different directions and user actuation of a respective one of the first, second, third and fourth pairs of sensors provides for control in a respective one of the remaining four different directions.

45 Claims, 3 Drawing Sheets

| 131 | 132 | 133 | 134 | 135 | 136 | EN | INFO. | Movement Direction |
|---|---|---|---|---|---|---|---|---|
| TL | T | TR | BL | B | BR | | | |
| | x | | | | | 1 | 100 | ↑ |
| | | | | x | | 1 | 001 | ↓ |
| | | | | | | 1 | 010 | ← |
| x | | | | | | 1 | 010 | ← |
| | | | x | | | 1 | 010 | ← |
| x | | | x | | | 1 | 010 | ← |
| | | x | | | | 1 | 101 | → |
| | | | | | x | 1 | 101 | → |
| | | x | | | x | 1 | 101 | → |
| x | x | | | | | 1 | 110 | ↖ |
| | x | x | | | | 1 | 011 | ↗ |
| | | x | x | | | 1 | 111 | ↙ |
| | | | x | x | | 1 | 000 | ↘ |
| x | x | x | | | | 1 | 100 | ↑ |
| | | | x | x | x | 1 | 001 | ↓ |
| | | | | | | 0 | | |
| | | | | | | 0 | | |
| | | | | | | 0 | | |
| - Other Permutations - | | | | | | 0 | | |
| | | | | | | 0 | | |
| | | | | | | 0 | | |

|  | | 130 | | | | | 34 | | Movement |
| 131 | 132 | 133 | 134 | 135 | 136 | EN | INFO. | Direction |
| TL | T | TR | BL | B | BR | | | |
|---|---|---|---|---|---|---|---|---|
|  | X |  |  |  |  | 1 | 100 | ↑ |
|  |  |  |  | X |  | 1 | 001 | ↓ |
| X |  |  |  |  |  | 1 | 010 | ← |
|  |  |  | X |  |  | 1 | 010 | ← |
| X |  |  | X |  |  | 1 | 010 | ← |
|  |  | X |  |  |  | 1 | 101 | → |
|  |  |  |  |  | X | 1 | 101 | → |
|  |  | X |  |  | X | 1 | 101 | → |
| X | X |  |  |  |  | 1 | 110 | ↖ |
|  | X | X |  |  |  | 1 | 011 | ↗ |
|  |  |  | X | X |  | 1 | 111 | ↙ |
|  |  |  |  | X | X | 1 | 000 | ↘ |
| X | X | X |  |  |  | 1 | 100 | ↑ |
|  |  |  | X | X | X | 1 | 001 | ↓ |
|  |  | —Other Permutations— |  |  |  |  | 0000000 | |

Fig. 4

USER INTERFACE

FIELD OF THE INVENTION

The present invention relates to a user interface for a hand portable device. In particular, it relates to a input mechanism using the keypad of the hand portable device.

BACKGROUND OF THE INVENTION

At the present time, desktop computers use peripheral devices for user input. The mouse is the standard cursor control device used for most applications. The joystick is the standard input device used for gaming. Both of these devices are relatively bulky and are connected to the desktop computer. They are therefore generally unsuitable for portable computing. In one type of portable computer, the keyboard has integrated within it a joystick-like device which can be used to control the cursor instead of a mouse.

It would be desirable to provide joystick-like control in a hand portable device without having to integrate a joystick or use peripheral devices.

One way of providing joystick like control on a mobile phone would be to assign a key in a numeric keypad to each of 8 directional movements: North, South, East, West, North-East, South-East, South-West and North West. Thus the keypad would be operable as an 8-way directional controller. This would be achieved using the array of three columns and four rows of data input keys on a mobile phone by assigning three of the rows to 8-way directional control. For example, the keys for inputting "1", "2", "3", "4", "6", "7", "8" and "9" would respectively be used for moving NW, N, NE, W, E, SW, S and SE. The key for inputting "5" would be redundant.

The inventor has realised that such an arrangement is not intuitive and generally requires a user to locate a key visually before it is pressed. The inventor has additionally realised that this disadvantage arises from the presence of a redundant key, the use of a large number of keys to achieve the control, and the relatively large separation between, for example, keys for inputting "1" and "9", that is for moving from NW to SE.

SUMMARY OF THE INVENTION

It therefore an object of the present invention to provide an improved joystick-like control in a hand portable device using a keypad.

According to one aspect of the present invention there is provided a hand portable device comprising: a user input device comprising a plurality of sensors for tactile actuation by a user including a first sensor and a second sensor adjacent thereto; and control means responsive to the actuation of the first sensor by itself to produce a first control signal, responsive to the actuation of the second sensor by itself to produce a second control signal different from the first control signal, and responsive to the simultaneous actuation of the first and second sensors in combination to produce a third control signal different from the first and second control signals.

According to another aspect of the invention there is provided a method of providing directional control, using the sensors of a keypad of a hand portable device, comprising the steps of: simultaneously sensing an input from each one of a plurality of sensors; associating predetermined control signals with predetermined combinations of simultaneous inputs; detecting simultaneous combinations of inputs to produce a first control signal in response to the actuation of a first sensor by itself, to produce a second control signal in response to actuation of a second sensor by itself, and to produce a third control signal in response to actuation of the first sensor and the second sensor together.

According to a third aspect of the present invention there is provided a user input device for providing 8-way directional control, comprising: a first set of sensors consisting of a first sensor adjacent a second sensor, constituting a first pair of sensors, and a third sensor adjacent the second sensor, constituting a second pair of sensors; and a second set of sensors, adjacent the second set of sensors, consisting of a fourth sensor adjacent a fifth sensor, constituting a third pair of sensors, and a sixth sensor adjacent the fifth sensor, constituting a fourth pair of sensors; wherein user actuation of a respective one of at least four of the six sensors provides for control in a respective one of four different directions and user actuation of a respective one of the first, second, third and fourth pairs of sensors provides for control in a respective one of the remaining four different directions.

According to a further aspect of the present invention there is provided a method of providing 8-way directional control using a user input device comprising a first set of sensors consisting of a first sensor adjacent a second sensor, constituting a first pair of sensors, and a third sensor adjacent the second sensor, constituting a second pair of sensors and a second set of sensors, adjacent the second set of sensors, consisting of a fourth sensor adjacent a fifth sensor, constituting a third pair of sensors, and a sixth sensor adjacent the fifth sensor, constituting a fourth pair of sensors, comprising the step of: actuating predetermined ones of the sensors to move in any one of a first four orthogonal directions, and actuating predetermined ones of the four pairs of the sensors to move in any one of a second four orthogonal directions, off-set by 45 degrees from the first four orthogonal directions.

Thus embodiments of the present invention provides for the control of the element (for example a cursor or a character in a game) on the screen, for example, by using an existing keypad in a non-standard manner.

BRIEF DESCRIPTION OF THE DRAWINGS

For a better understanding of the present invention and to understand how the same may be brought into effect, reference will now be made by way of example only to the accompanying drawings in which:

FIG. 4 is a table illustrating how the actuation of keys in a 2×3 array provides eight directional control signals.

DETAILED DESCRIPTION OF THE INVENTION

Figure 1:
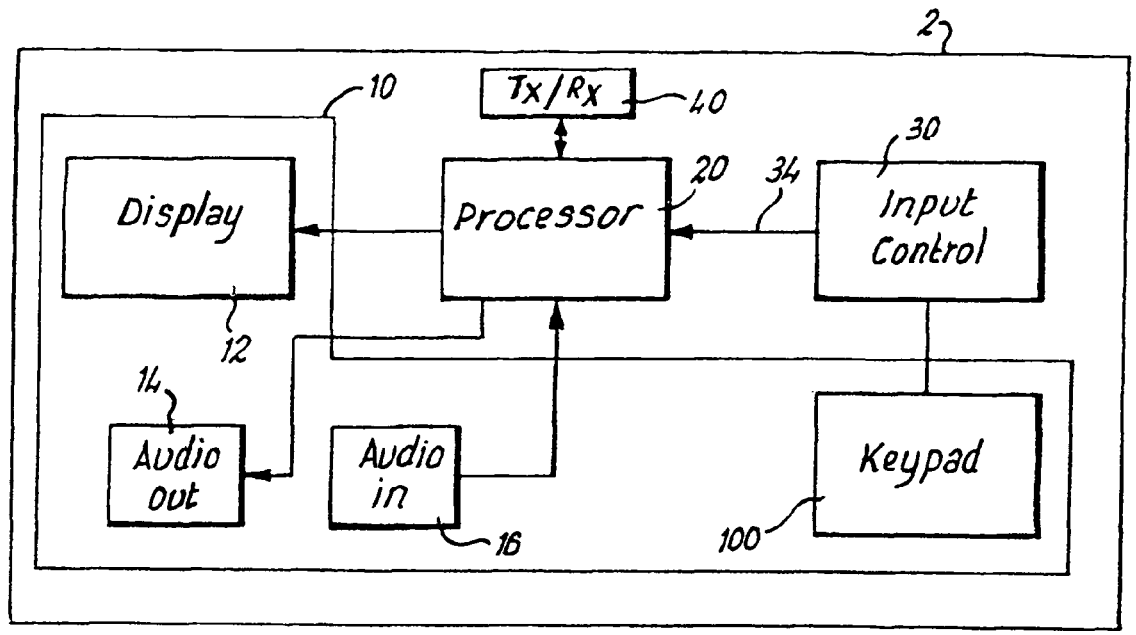
FIG. 1 is a schematic illustration of a hand portable device.

FIG. 1 is a schematic illustration of a hand portable device 2 which in this example is a mobile phone. The hand portable device 2 comprises a user interface 10, a processor 20, an input controller 30 and a radio frequency transceiver 40. The processor 20 is bi-directionally connected, to receive an input and provide an output to the user interface 10 and the radio frequency transceiver 40. The user interface 10 comprises a display 12, an audio output 14, an audio input 16 and a keypad 100. The keypad 100 is connected to the input controller 30 which in turn is connected to the processor 20. The keypad 100 comprises a number of function keys 110 and a number of data input keys 120 for inputting numerals and/or alphanumeric characters.

Figure 2A:
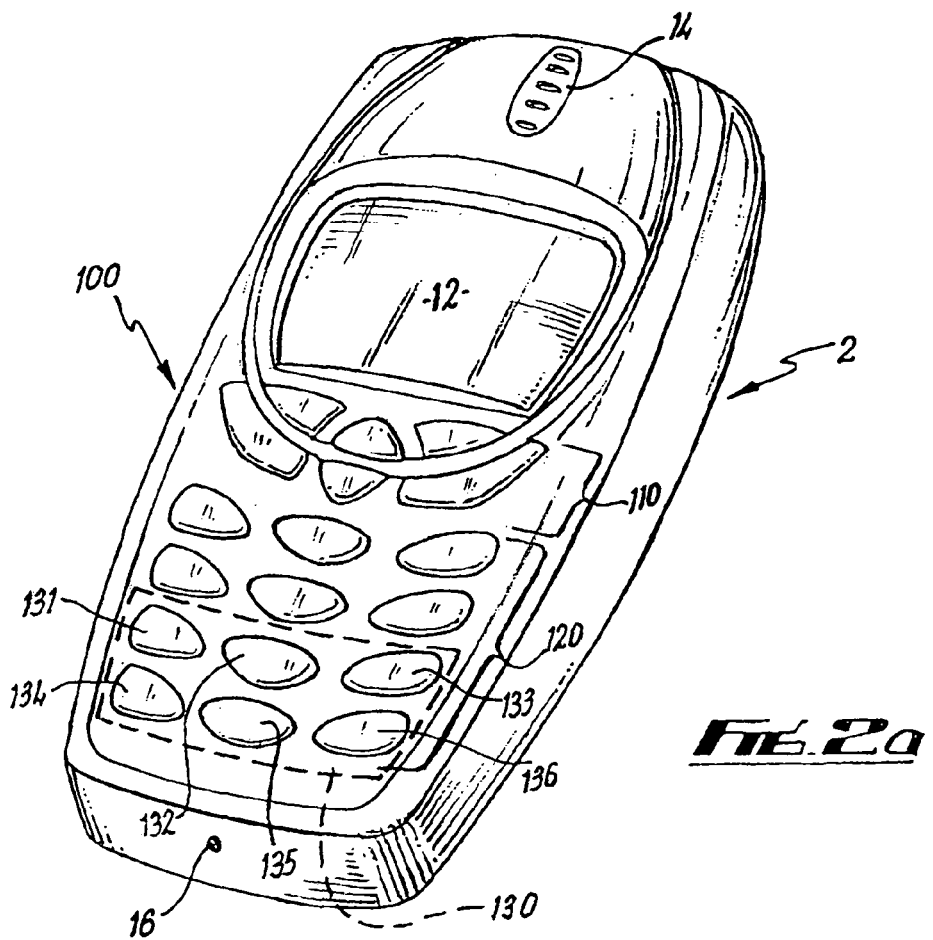
FIG. 2a illustrates a mobile phone having a conventional 4×3 keypad array for data entry.

FIG. 2a illustrates a hand portable mobile phone 2 having a twelve key arrangement (three columns and four rows) of keys 120. The data input keys 120 have a sub-set of a plurality of keys 130 arranged as three columns and two rows of six keys. The top left (TL) key 131 is at column one, row one (1, 1). The top centre (T) key 132 is at row one, column two (1, 2). The top right (TR) key 133 is at row one, column three (1, 3). The bottom left (BL) key 134 is at row two, column one (2, 1). The bottom centre (B) key 135 is at row two, column two (2, 2). The bottom right (BR) key 136 is at row two, column three (2, 3).

Figure 2B:
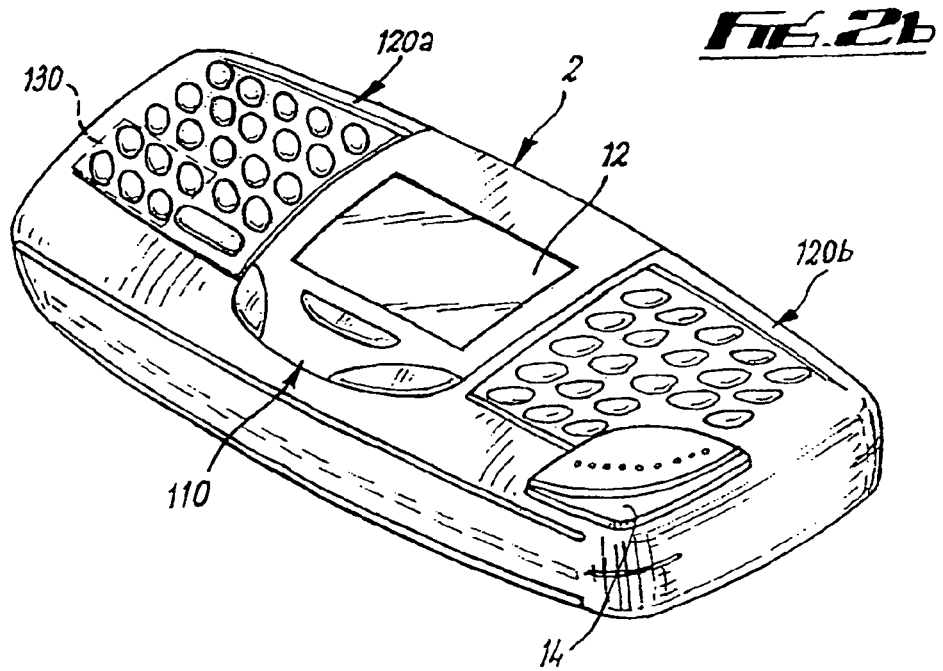
FIG. 2b illustrates a mobile phone having a QWERTY keypad for data entry.

FIG. 2b illustrates a hand portable mobile phone 2 having a keypad 100 for typing. The data input keys 120 includes a key for each letter in the alphabet (e.g. a QWERTY keyboard). The data input keys are divided into two portions. A first half 120a and a second half 120b are separated by the display 12 and the function keys 110. The data input keys 120 have a sub-set of a plurality of keys 130 arranged as three columns and two rows of six keys. The top left (TL) key 131 is at column one, row one (1, 1). The top centre (T) key 132 is at row one, column two (1, 2). The top right (TR) key 133 is at row one, column three (1, 3). The bottom left (BL) key 134 is at row two, column one (2, 1). The bottom centre (B) key 135 is at row two, column two (2, 2). The bottom right (BR) key 136 is at row two, column three (2, 3).

The keys 131, 132 and 133 are arranged linearly with no intermediate key between them and they form a first set of keys. Although the first set of keys, as illustrated in FIGS. 2a and 2b, are arranged substantially rectilinearly they may in other embodiments be arranged curvilinearly. The keys 134, 135 and 136 are arranged linearly with no intermediate key between them and they form a second set of keys. Although the second set of keys, as illustrated in FIGS. 2a and 2b, are arranged substantially rectilinearly they may in other embodiments be arranged curvilinearly. The second set of keys and the first set of keys extend substantially parallel to each other without any intermediate keys between them. The key pairs 131 and 134, 132 and 135 and 133 and 136 are aligned substantially parallel to each other.

In the embodiments illustrated in FIGS. 2a and 2b the keys 131-136 form an array of 2 rows and 3 columns. A portion of each of the keys 131-133 lies on a first rectilinear axis defining the first row and a portion of each of the keys 134-136 lies on a second rectilinear axis, parallel to the first rectilinear axis, defining the second row. A portion of each of the keys 131 and 134 lies on a third rectilinear axis, perpendicular to the first axis, defining the first column. A portion of each of the keys 132 and 135 lies on a fourth rectilinear axis, parallel to the third axis, defining the second column. A portion of each of the keys 133 and 136 lies on a fifth rectilinear axis, parallel to the third axis, defining the third column.

The distance between the adjacent keys in the first set and the adjacent keys in the second set is from 2 to 6 mm. The distance between the first and second sets of keys is between 3 and 8 mm. Thus each of the keys 131-136 can be actuated by rolling a thumb or index digit about a fixed position. The key 132 or 135 preferably has a textured surface to allow orientation of the thumb or index finger on the keypad without using sight.

Figure 3:
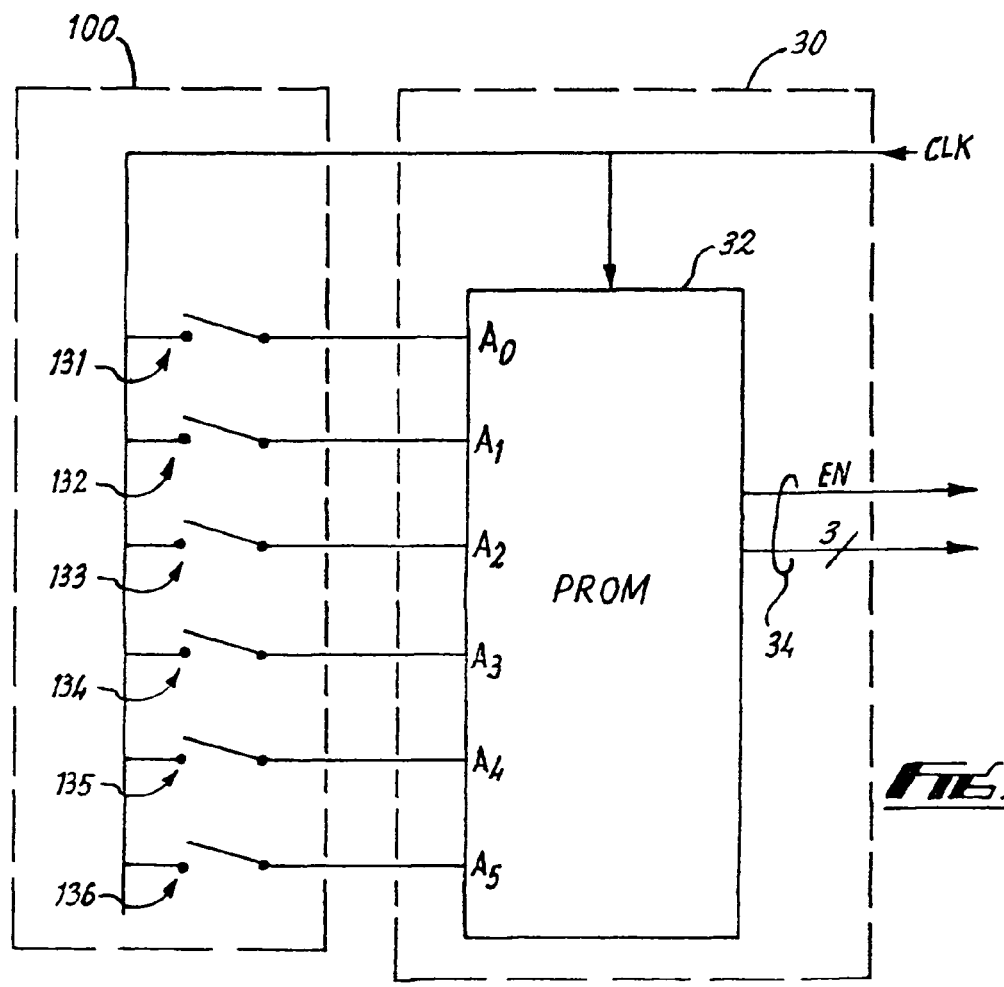
FIG. 3 illustrates circuitry which converts the input from six discrete keys into eight distinct signals for controlling directional movement.

FIG. 3 illustrates the plurality of keys 130 including the keys 131, 132, 133, 134, 135 and 136. Each key ha an underlying switch which in a steady state is open. The actuation of a key by the user closes the switch. The input of each of the switches is connected to a clock signal. The output of the switch corresponding to key 131 provides the first bit of an address to a programmed read-only memory (PROM) 32. The output of the switch corresponding to key 132 provides a second bit of an address to the PROM 32. The output of the switch corresponding to key 133 provides the third bit of an address to PROM 32. The output of the switch corresponding to key 134 provides the fourth bit of an address to PROM 32. The output of the switch corresponding to the key 135 provides the fifth bit of an address to the PROM 32. The output of the switch corresponding to the key 136 provides the sixth bit of an address to the PROM 132. When a switch is in the open, non-actuated position, it provides a logic LOW value as the address bit. When the switch is closed, it provides a logic HIGH value as the address bit with each clock pulse. Consequently, each of the permutations in which the plurality of keys 130 can be actuated either by themselves or in any combination, has a corresponding unique six bit address which is inputted to the PROM 32. The PROM 32 produces a four bit parallel output for each distinct address applied to its input. Thus each possible permutation of actuations of the plurality of keys 130 produces a predefined four bit output 34. The first bit of the four bit output 34 is an enable signal and the remaining three bits is an information signal which represents one of the eight possible directional movements of a joystick which corresponds on a compass to North (moving the joystick forward), South (moving the joystick back), West (moving the joystick to the left), East (moving the joystick to the right), North West (moving the joystick forward and to the left), North East (moving the joystick forward and to the right), South East (moving the joystick back and to the right) and South West (moving the joystick back and to the left).

FIG. 4 illustrates a table which shows the relationship between the actuation of the switches 131 to 136 and the output 34 from the PROM 32. The table has six columns one for each of the keys 131 to 136. An "X" in a column headed by a particular key indicates the actuation of that key if one then moves along the row in which that X occurs to columns seven and eight of the table, they indicate the four bit signal 34 including the first enable bit and the three information bits. Column nine of the table indicates which of the eight possible directional movements the output 34 from the PROM 32 indicates to the processor 20.

It will therefore be apparent from the table of FIG. 4 that the actuation of the top centre (T) key 132 by itself corresponds to the movement of a joystick in the North direction. Actuation of the bottom centre (B) key 135 by itself corresponds to the movement of a joystick in the South direction. Actuation of the top left (TL) key 131 by itself or actuation of the bottom left (BL) key 134 by itself or actuation of the top left (TL) key 131 and the bottom left (BL) key 134 together corresponds to the movement of a joystick in the West direction. Actuation of the top right (TR) key 133 by itself or the bottom right (BR) key 136 by itself or actuation of the top right (TR) key 133 and the bottom right (BR) key 136 together corresponds to the movement of a joystick in the East direction. Actuation of the top left (TL) key 131 and the top centre (T) key 132 together corresponds to movement of a joystick in the North West direction. Actuation of the top centre (T) key 132 and the top right (TR) key 133 together corresponds to the movement of a joystick in the North East direction. Actuation of the bottom left (BL) key 134 and the bottom centre (B) key 135 together corresponds to the movement of a joystick in the South West direction. Actuation of the bottom centre (B) key 135 and the bottom right (BR) key 136 together corresponds to movement of a joystick in the North East direction. All other input permutations of the plurality of keys 130 results in the first bit of the output of the PROM 32 being logic LOW which corresponds to no movement of a joystick.

According to one embodiment (shown in FIG. 4) the actuation of the top left (TL) key 131, the top centre (T) key 132 and the top right (TR) key 133 together is interpreted as actuation of only the top centre (T) key 132. Likewise the simultaneous actuation of the bottom left (BL) key 134, the bottom centre (B) key 135 and the bottom right (BR) key 136 is interpreted as the actuation of only the bottom centre (B) key 135.

When the first bit of the output of the PROM 32 is HIGH, the processor interprets the three information bits which constitute the remainder of the output of the PROM 32. Thus the 2×3 array of keys 131 to 136 provides an eight way input which emulates a joystick.

It is preferable for the actuation of one or more of the plurality of keys 130 to occur by the pivoting of an index finger or thumb between the top centre (T) key 132 and the bottom centre (B) key 135. A forward rocking motion of the digit therefore actuates the top centre (T) key 132 and a backward rocking motion of the digit actuates the bottom centre (B) key 135. A leftwards rocking motion of the digit actuates either one or both of the top left (TL) key 131 and the bottom left (BL) key 134 and a rightwards rocking motion of the digit actuates either one or both of the top right (TR) key 133 and the bottom right (BR) key 136. A rocking motion of the digit in the North Westerly direction actuates both the top left (TL) key 131 and the top centre (T) key 132. A rocking of the digit in the North Easterly direction actuates both the top centre (T) key 132 and the top right (TR) key 133. A rocking motion of the digit in the South Easterly direction actuates both the bottom right (BR) key 136 and the bottom centre (B) key 135. A rocking motion of the digit in the South Westerly direction actuates both the bottom left (BL) key 134 and the bottom centre (B) key 135. Thus the plurality of keys 130 provides for eight way control using one digit, which is pivoted about a stationary point. To enable the eight way directional control with the pivoting of a single digit it is preferable for the plurality of keys 130 to lie within a rectangle having a length of approximately 20 mm and a height of approximately 15 mm. Thus the 8-way control provided by the keypad is highly intuitive and does not requires a digit to be lifted from the keypad and re-oriented to simultaneously actuate two keys. The keypad can therefore be easily used for 8-way control without looking at it.

It should be made apparent that the plurality of keys 130 are not keys which are dedicated to the aforementioned joystick-like control. They are keys which in a data entry mode indicate a numeral or letter for input but which in a cursor control or gaming mode provide for eight way directional control. In such a data entry mode the simultaneous depression of two keys is ambiguous and processor 20 is programmed not to interpret such a simultaneous depression as a special input.

The plurality of key 130 may be used to control a cursor on the display 12 or move an element within a game displayed from a third person perspective. Alternatively, a game may be displayed from a first person perspective of the game character in which case the plurality of keys change the perspective by 'moving' the character.

Although the plurality of keys 130 are implemented as switches in FIG. 3, the invention is not limited to this implementation as any device (sensor) which senses touch may be used.

It is envisaged that the normal cover of a mobile phone having twelve openings for each of the twelve data input keys could be replaced by a cover in which keys "1" to "6" or the keys "4" to "#" are replaced by a single key or joystick device. The sensor or switches associated with each of the keys is unaffected. The underside of the single key is arranged so that it actuates a single sensor or pairs of sensors to provide 8-way directional control in the manner previously described.

Although a PROM 32 was used in FIG. 3 to translate the possible permutations of actuations of the plurality of keys into eight control signals, other means exist for carrying out the same purpose. For example, discrete logical elements, programmable logic devices or a programmed microcontroller could be used. In fact, the processor 20, itself, could carry out the process using software.

Although in the foregoing the keys 131-136 are in a 2 row by three column arrangement, they could of course be re-oriented in a 3 row by two column arrangement.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A device comprising:
a user input device comprising a plurality of sensors in an array for providing N-way directional control, the array being for tactile actuation by a user;
a controller responsive to the actuation of a sensor by itself or the simultaneous actuation of a pair of adjacent sensors, the
controller being configured to produce one of N different directional control signals upon actuation of a sensor by itself, or upon simultaneous actuation of an adjacent pair of sensors; and
wherein each of the N directional control signals belong to a first set of directional control signals or a second set of directional control signals, wherein each sensor in the array is associated with only one of the directional control signals of the first set and wherein each of the directional control signals of the second set is associated with an adjacent pair of sensors in the array, but not every one of the adjacent pairs of sensors is associated with a directional control signal of the second set.

2. A device as claimed in claim 1, wherein the plurality of sensors comprises a first set of sensors consisting of a first sensor adjacent a second sensor, constituting a first pair of sensors, and a third sensor adjacent the second sensor, constituting a second pair of sensors; and a second set of sensors consisting of a fourth sensor adjacent a fifth sensor, constituting a third pair of sensors, and a sixth sensor adjacent the fifth sensor, constituting a fourth pair of sensors.

3. A device as claimed in claim 1 wherein an adjacent pair of sensors comprise two sensors that are located and arranged to be simultaneously actuated by a user using one digit.

4. A device as claimed in claim 2 wherein the first set of sensors is adjacent the second set of sensors.

5. A device as claimed in claim 2, wherein the controller is responsive to user actuation of a respective one of at least four of the six sensors to provide a respective one of four different directional control signals and is responsive to user actuation of a respective one of the first, second, third and fourth pairs of sensors to provide a respective one of an additional four different control signals.

6. A device as claimed in claim 1, wherein the controller is configured to produce:
(a) a first directional control signal in response to the actuation of a second sensor;
(b) a second directional control signal in response to the actuation of a first sensor;

(c) a third directional control signal in response to actuation of both the first and second sensors simultaneously;
(d) a fourth directional control signal in response to the actuation of a third sensor;
(e) a fifth directional control signal in response to the actuation of both the second and third sensors simultaneously;
(f) a sixth directional control signal in response to the actuation of a fifth sensor;
(g) a seventh directional control signal in response to the actuation of both the fifth and sixth sensors simultaneously; and
(h) an eighth directional control signal in response to the actuation of both the fourth and fifth sensors simultaneously.

7. A device as claimed in claim 6 wherein the controller, in response to the actuation of only the fourth sensor, is configured to produce the second directional control signal, and in response to actuation of only the sixth sensor, is configured to produce the fourth directional control signal.

8. A device as claimed in claim 1 wherein the controller comprises a detector for detecting the simultaneous actuation of keys.

9. A device as claimed in claim 1 wherein the plurality of sensors is a 2×3 or 3×2 array of sensors.

10. A device as claimed in claim 2 wherein the user input device is a keypad having first, second, third, fourth, fifth and sixth keys which respectively actuate the first, second, third, fourth, fifth and sixth sensors whereby the first, second, third and fourth pairs of sensors have corresponding first, second, third and fourth pairs of keys.

11. A device as claimed in claim 10 wherein each pair of keys are located and arranged to be simultaneously actuated by a user using one digit.

12. A device as claimed in claim 10 wherein the pairs of keys are located and arranged to be actuated by a user rolling or pivoting one digit.

13. A device as claimed in claim 10, wherein the first, second and third keys are arranged curvilinearly.

14. A device as claimed in claim 10, wherein the first, second and third keys are arranged rectilinearly.

15. A device as claimed in claim 10 wherein the fourth, fifth and sixth keys are arranged substantially parallel to the first, second and third keys.

16. A device as claimed in claim 10, wherein the first, second, third, fourth, fifth and sixth keys form an array.

17. A device as claimed in claim 1 wherein the first, second, third, fourth, fifth and sixth keys occupy an area not significantly exceeding 20 mm by 15 mm.

18. A device as claimed in claim 10 wherein the keypad comprises a 4×3 array of mobile telephone keys.

19. A device as claimed in claim 10 wherein the keypad is a typist's keypad.

20. A device as claimed in claim 10 having a data entry mode where the keypad including the plurality of keys are used to enter data wherein in said data entry mode the controller is responsive to the actuation of the first key and second key separately but not together to produce different directional control signals.

21. A device as claimed in claim 1 further comprising a display for displaying an image including an element moving in the display, wherein the first directional control signal causes the element to move in a first direction, the second directional control signal causes the element to move in a second direction and the third directional control signal causes the element to move in a third direction intermediate of the first and second directions.

22. A device as claimed in claim 1 further comprising a display for displaying an image having a perspective dependent upon a notional viewing position, wherein the first directional control signal causes the notional viewing position to move in a first direction, the second directional control signal causes the notional viewing position to move in a second direction and the third directional control signal causes the notional viewing position to move in a third direction intermediate of the first and second directions.

23. A method of providing N-way directional control using more than N/2 but less than N sensors in an array to provide N different directional control signals, wherein each of the N different directional control signals is a member of either first set of directional control signals or a second, different, set of directional control signals, the method comprising:
associating each one of the sensors in the array with only one directional control signal from the first set of directional control signals;
associating each of the directional control signals of the second set with a pair of sensors in the array without associating each of the pairs of sensors in the array with a directional control signal of the second set;
detecting when a sensor or sensors of the array are actuated; and providing the directional control signal associated with the detected actuated sensor(s).

24. A device, for providing 8-way directional control, comprising
a first set of sensors consisting of a first sensor adjacent a second sensor, constituting a first pair of sensors, and a third sensor adjacent the second sensor, constituting a second pair of sensors; and
a second set of sensors, adjacent the first set of sensors, consisting of a fourth sensor adjacent a fifth sensor, constituting a third pair of sensors, and a sixth sensor adjacent the fifth sensor, constituting a fourth pair of sensors; wherein
user actuation of a respective one of at least four of the six sensors provides for control in a respective one of four different directions and
user actuation of each of the first, second, third and fourth pairs of sensors provides for control in a respective one of the remaining four different directions.

25. A device as claimed in claim 24, wherein the pairs of sensors are located and arranged to be simultaneously actuated by a user using one digit.

26. A device as claimed in claim 24, wherein the plurality of sensors is a 2×3 or 3×2 array of sensors.

27. A device as claimed in claim 24, comprising a keypad having first, second, third, fourth, fifth and sixth keys which respectively actuate the first, second, third, fourth, fifth and sixth sensors whereby the first, second, third and fourth pairs of sensors have corresponding first, second, third and fourth pairs of keys.

28. A device as claimed in claim 27 wherein each pair of keys are located and arranged to be simultaneously actuated by a user using one digit.

29. A device as claimed in claim 27 wherein the pairs of keys are located and arranged to be actuated by a user rolling or pivoting one digit.

30. A device as claimed in claim 27, wherein the first, second and third keys are arranged curvilinearly.

31. A device as claimed in claim 27, wherein the first, second and third keys are arranged rectilinearly.

32. A device as claimed in claim 27 wherein the fourth, fifth and sixth keys are arranged substantially parallel to the first, second and third keys.

33. A device as claimed in claim 27, wherein the first, second, third, fourth, fifth and sixth keys form an array.

34. A device as claimed in claim 27, wherein the first, second, third, fourth, fifth and sixth keys occupy an area not significantly exceeding 20 mm by 15 mm.

35. A device as claimed in claim 27 wherein the keypad comprises a 4×3 array of mobile telephone keys.

36. A device as claimed in claim 27, wherein the keypad is a typist's keypad.

37. A device comprising a device as claimed in claim 24, and a controller, wherein the controller is configured to produce:
   (a) a first control signal in response to the actuation of the second sensor;
   (b) a second control signal in response to the actuation of the first sensor;
   (c) a third control signal in response to actuation of both the first and second sensors simultaneously;
   (d) a fourth control signal in response to the actuation of the third sensor;
   (e) a fifth control signal in response to the actuation of both the second and third sensors simultaneously;
   (f) a sixth control signal in response to the actuation of the fifth sensor;
   (g) a seventh control signal in response to the actuation of both the fifth and sixth sensors simultaneously; and
   (h) an eighth control signal in response to the actuation of both the fourth and fifth sensors simultaneously.

38. A device as claimed in claim 37 wherein the controller, in response to the actuation of only the fourth sensor, is configured to produce the second control signal and, in response to actuation of only the sixth sensor, is configured to produce the fourth control signal.

39. A device as claimed in claim 37, wherein the controller comprises a detector for detecting the simultaneous actuation of keys.

40. A device as claimed in claim 37 having a data entry mode where the keypad including the plurality of keys are used to enter data wherein in said data entry mode the controller is responsive to the actuation of the first key and second key separately but not together to produce different control signals.

41. A device as claimed in claim 37 further comprising a display for displaying an image including an element moving in the display, wherein the first control signal causes the element to move in a first direction, the second control signal causes the element to move in a second direction and the third control signal causes the element to move in a third direction intermediate of the first and second directions.

42. A device as claimed in claim 37, further comprising a display for displaying an image having a perspective dependent upon a notional viewing position, wherein the first control signal causes the notional viewing position to move in a first direction, the second control signal causes the notional viewing position to move in a second direction and the third control signal causes the notional viewing position to move in a third direction intermediate of the first and second directions.

43. A method of providing 8-way directional control using a user input device comprising a first set of sensors consisting of a first sensor adjacent a second sensor, constituting a first pair of sensors, and a third sensor adjacent the second sensor, constituting a second pair of sensors and a second set of sensors, adjacent the first set of sensors, consisting of a fourth sensor adjacent a fifth sensor, constituting a third pair of sensors, and a sixth sensor adjacent the fifth sensor, constituting a fourth pair of sensors, comprising the steps of:
   actuating predetermined ones of the sensors to move in any one of a first four orthogonal directions, and
   actuating each of the predetermined the four pairs of the sensors to move in respective ones of a second four orthogonal directions, off-set by 45 degrees from the first four orthogonal directions.

44. A device for providing N-way directional control, the device comprising:
   a user input device comprising more than N/2 sensors but less than N sensors in an array for directional control, the array being for tactile actuation by a user;
   a controller responsive to the actuation of a sensor by itself or the simultaneous actuation of a pair of adjacent sensors;
   wherein the controller produces one of N different directional control signals upon actuation of a sensor by itself, or upon the simultaneous actuation of an adjacent pair of sensors; and
   wherein each of the N directional control signals belong to a first set of directional control signals or a second set of directional control signals, wherein each sensor in the array is associated with only one of the directional control signals of the first set and wherein each of the directional control signals of the second set is associated with an adjacent pair of sensors in the array, but not every one of the adjacent pair of sensors is associated with a directional control signal of the second set.

45. A method, comprising:
   associating each one of the sensors in an array with only one directional control signal from a first set of directional control signals;
   associating each of the directional control signals of a second set of directional control signals with an adjacent pair of sensors in the array without associating each of the pairs of sensors in the array with a directional control signal of the second set;
   detecting when a sensor in the array is actuated, or when an adjacent pair of sensors in the array are simultaneously actuated; and
   producing the directional control signal associated with the detected actuated sensor(s).

* * * * *